UNITED STATES PATENT OFFICE.

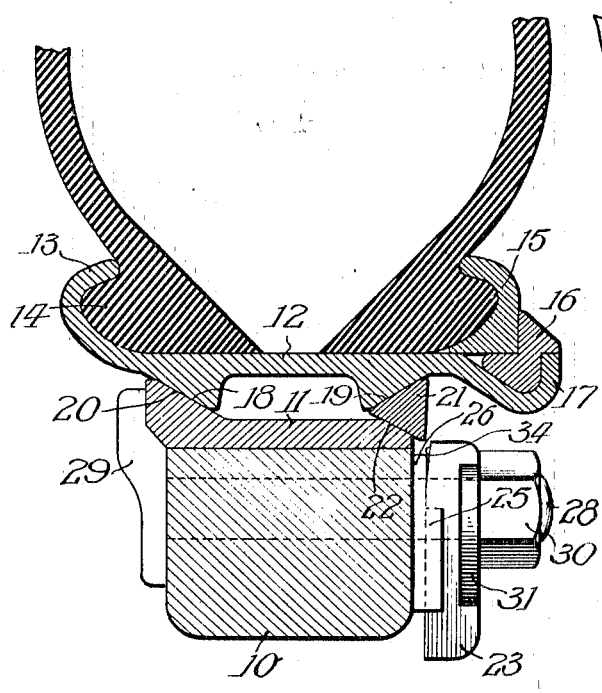
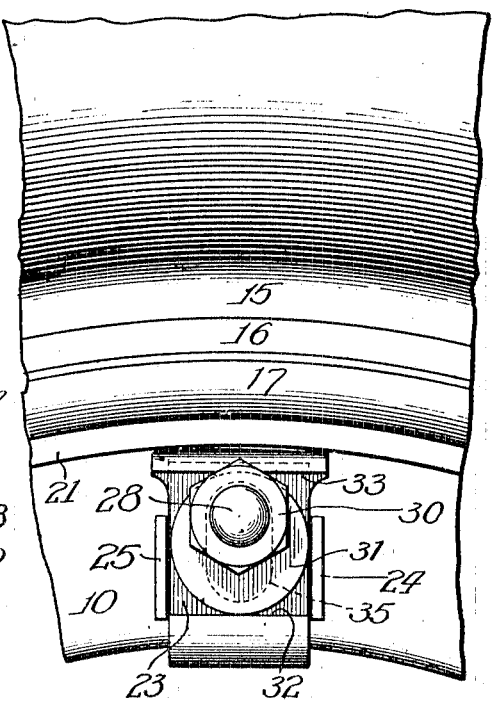
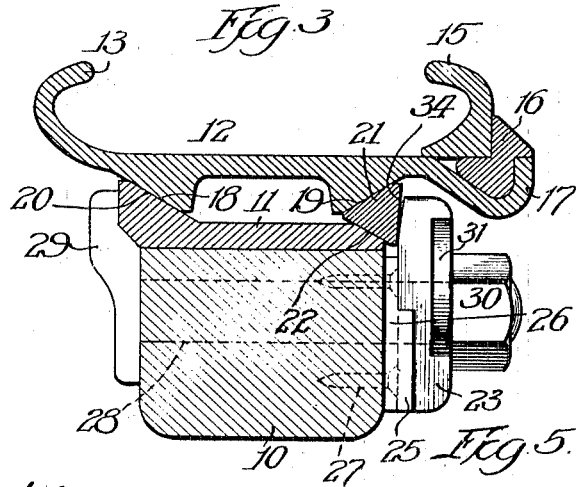
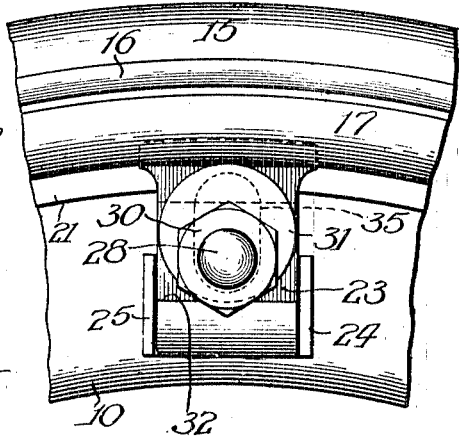
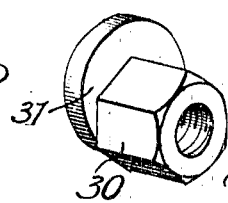

FREDELLIA H. MOYER, OF AKRON, OHIO, ASSIGNOR TO THE FIRESTONE TIRE & RUBBER COMPANY, OF AKRON, OHIO, A CORPORATION OF OHIO.

CLAMPING DEVICE FOR DEMOUNTABLE VEHICLE-RIMS.

1,059,382. Specification of Letters Patent. Patented Apr. 22, 1913.

Application filed April 19, 1911. Serial No. 622,140.

*To all whom it may concern:*

Be it known that I, FREDELLIA H. MOYER, a citizen of the United States, residing at Akron, in the county of Summit and State of Ohio, have invented certain new and useful Improvements in Clamping Devices for Demountable Vehicle-Rims, of which the following is a specification.

My invention relates to improvements in means for holding tire-carrying wheel rims in position, and particularly to a clamping device for such wheel rims which permits a rim to be quickly removed and replaced.

The object of the invention is to provide a simple and reliable device for this purpose which allows the wheel rim to be removed and replaced with a minimum expenditure of time and labor.

In an improved embodiment of my invention I employ a tire-carrying rim having a pair of inclined faces on its inner side, these faces converging inwardly or toward the center of the wheel. The felly rim is provided with an inclined seat which engages one of the inclined faces of the tire-carrying rim, while the other inclined face is engaged by a movable retaining member which is held in position by means of a clamping member which is made movable toward and away from the center of the wheel and which, when in its outermost position, overlaps the retaining member. The clamping member is moved, and retained in either its inner or outer position, by a cam-carrying member which is rotatably mounted on the side of the felly and may be turned by means of a wrench or other suitable tool.

In the accompanying drawings Figure 1 is a cross-sectional view of a portion of the felly of a wheel carrying a demountable rim, the felly being provided with my improved means for retaining the rim in position. In this figure the retaining cam is shown in the retracted or inoperative position; Fig. 2 is a side elevational view of the same parts as are shown in Fig. 1; Fig. 3 is a view similar to Fig. 1, but omitting the tire and showing the retaining cam in the operative position; Fig. 4 is a side elevational view of the parts which are shown in Fig. 3; and Fig. 5 is a perspective view of the retaining cam member.

In these several figures 10 is the felly of the wheel on which is mounted the felly rim 11. Surrounding the wheel outside the felly rim is the tire-carrying rim 12, which may be provided with the inturned lip 13 for gripping the retaining ear 14 of a clencher tire. The opposite edge of the tire is gripped by a tire-engaging member 15 which is held in position by a retaining ring 16, the latter being held in place by an upturned lip 17 which is formed on the tire-carrying rim 12.

The inner face of the tire-carrying rim 12 is formed with a pair of inclined faces or seats 18 and 19. These seats converge inwardly or toward the center of the wheel, the face 18 being engaged by a correspondingly inclined seat 20 on the felly rim. It will be seen that if the tire-carrying rim be slipped onto the wheel from the right hand side, as seen in Figs. 1 and 3, and be held in engagement with the seat 20, the tire-carrying rim will be prevented from moving in any direction. For this purpose there is provided a retaining member 21, which may consist of a ring, preferably of such cross-sectional form as to afford an inclined seat for engagement with the inclined face 19 of the tire-carrying rim. The inner side of this member engages a face 22, preferably inclined, on the felly rim.

To hold the retaining member 21 in position, there is provided a series of clamps, preferably about six in number, which are spaced at equal intervals around the felly of the wheel and carried thereby. Each of these clamps comprises a sliding member 23 which moves toward and away from the center of the wheel between a pair of guides 24, 25 formed on a plate 26. This plate is secured to the felly by suitable means such as screws 27. A bolt 28 passes through the felly and has its head 29 formed to engage one edge of the felly rim 11. The opposite end of this bolt is threaded to receive a member which comprises a nut 30 and circular cam 31 formed integrally. The cam portion 31 of this member occupies a depression in the face of the sliding clamp member 23 and engages the ends 32 and 33 of this depression as the nut 30 is rotated by means of a wrench or other suitable tool. It will be seen that as the nut is tightened upon the bolt, the clamping member 23 will be reciprocated toward and away from the center of the wheel. When this clamping member is in its outermost position it overlaps the retaining member 21 and holds the latter in position. In order that the clamping member 23 may be more readily thrust over the retaining member 21, and also to afford a wedging action between these parts, the inner face of the clamping member is slightly beveled at 34 near its outer edge. The clamping member is formed with a slot 35 for the passage of the bolt 28.

When it is desired to remove the rim with the tire thereon and substitute another rim, or replace the same rim with a new tire fitted thereto, the nut 30 will be given a half turn by means of a wrench or the like, which causes the cam portion 31 to move the clamp 23 inward or toward the center of the wheel and out of engagement with the retaining member 21. The latter may then be readily slipped out, which permits the tire-carrying rim to be slipped off the wheel toward the right in Fig. 1. In replacing the tire-carrying rim the operation is the reverse of that just described.

I claim:

1. In combination with the felly of a wheel, a felly rim and a tire rim, a retaining member preventing lateral movement between the felly rim and the tire rim, a clamping member movable toward and away from the center of the wheel and arranged to overlap said retaining member when in its outermost position, and a cam rotatably mounted on the felly portion of the wheel and arranged to move said clamping member.

2. In combination with the felly of a wheel, a felly rim and a tire rim having co-engaging inclined faces, a retaining member having an inclined surface for engaging the tire rim and preventing lateral movement between the felly rim and the tire rim, a clamping member supported on the felly of the wheel movable toward and away from the center of the wheel and arranged to overlap said retaining member when in its outermost position, and a cam rotatably mounted on the felly portion of the wheel and arranged to move said clamping member.

3. In combination with a felly rim and a tire rim, means for holding said tire rim in place comprising a retaining member arranged to engage the felly rim and the tire rim, a removable clamping member, a bolt extending through the felly of the wheel, and a cam member having a nut formed integrally therewith and threaded to engage the threads of the bolt.

4. In combination with the felly of a wheel, a felly rim and a tire rim, a retaining member preventing a relative movement between the felly rim and the tire rim, and separate clamping members arranged to overlap said retaining member, and an independently actuated cam mounted on the felly portion of the wheel and arranged to move each clamping member.

5. The combination with a tire rim and wheel rim, of means for securing the tire rim to the wheel rim, including a bolt projecting outwardly at the side of the wheel felly, a clamp movable radially of the wheel on said bolt, and a cam rotatably mounted on said bolt and engaging the clamp for shifting the same, substantially as described.

6. The combination with a tire rim and wheel rim, of means for securing the tire rim to the wheel rim including a bolt projecting outwardly at the side of the wheel felly, a clamp movable laterally on said bolt, a rotatable cam mounted on said bolt and engaging the clamp for shifting the same, and means for guiding the clamp in its movement comprising a plate secured to the side of the wheel felly having separated guide flanges between which the clamp may slide.

7. The combination with a tire rim and wheel rim, of means for securing the tire rim to the wheel rim including a bolt projecting outwardly at the side of the wheel felly, a clamp movable laterally on said bolt, a rotatable cam mounted on said bolt and engaging the clamp for shifting the same, and means for guiding the clamp in its movement comprising a plate secured to the side of the wheel felly having separated guide flanges between which the clamp may slide, and a nut engaging the bolt rotatable with the cam and adapted to fasten the parts together.

8. The combination with a tire rim and wheel rim, of means for securing the tire rim to the wheel rim including a wedge-shaped member engaged therebetween, a bolt projecting outwardly at the side of the wheel felly, a clamp movable radially of the wheel on the said bolt, and a cam rotatably mounted on said bolt and engaging the clamp for shifting the same, said clamp having a beveled inner surface, substantially as and for the purpose described.

9. The combination with a tire rim and wheel rim, of means for securing the tire rim to the wheel rim including a bolt projecting outwardly at the side of the wheel felly, a clamp movable radially of the wheel on said bolt, and a cam movably mounted on said bolt engaging the clamp for shifting the same, substantially as described.

FREDELLIA H. MOYER.

Witnesses:
S. G. CARKHUFF,
V. M. GREER.